(12) United States Patent
Kapusky et al.

(10) Patent No.: US 11,142,100 B2
(45) Date of Patent: Oct. 12, 2021

(54) SLOUCH SEAT WITH LINK ARM

(71) Applicants: ADIENT LUXEMBOURG HOLDING S.À R.L., Luxembourg (LU); Michael Kapusky, South Lyon, MI (US)

(72) Inventors: Michael Kapusky, South Lyon, MI (US); Eric Michalak, Canton, MI (US); Nathan Caruss, Ann Arbor, MI (US); Jennifer Carlson, Ypsilanti, MI (US); Brent Burton, Windsor (CA); Matthew McClelland, Trenton, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 429 days.

(21) Appl. No.: 16/316,888

(22) PCT Filed: Jul. 7, 2017

(86) PCT No.: PCT/US2017/041151
§ 371 (c)(1),
(2) Date: Jan. 10, 2019

(87) PCT Pub. No.: WO2018/013424
PCT Pub. Date: Jan. 18, 2018

(65) Prior Publication Data
US 2019/0315252 A1    Oct. 17, 2019

Related U.S. Application Data

(60) Provisional application No. 62/362,241, filed on Jul. 14, 2016.

(51) Int. Cl.
*B60N 2/22* (2006.01)
*B60N 2/07* (2006.01)
(Continued)

(52) U.S. Cl.
CPC ............ *B60N 2/2209* (2013.01); *B60N 2/07* (2013.01); *B60N 2/12* (2013.01); *B60N 2/3011* (2013.01)

(58) Field of Classification Search
CPC ...... B60N 2/2209; B60N 2/0232; B60N 2/07; B60N 2/065; B60N 2/0727; B60N 2/12; B60N 2/164; B60N 2/3011
(Continued)

(56) References Cited

U.S. PATENT DOCUMENTS

| 5,794,470 A | 8/1998 | Stringer |
| 6,336,679 B1 * | 1/2002 | Smuk .................. B60N 2/0705 |
| | | 297/341 |

(Continued)

FOREIGN PATENT DOCUMENTS

| JP | H0672198 A | 3/1994 |
| JP | 2001070089 A | 3/2001 |
| WO | 2015077231 A1 | 5/2015 |

OTHER PUBLICATIONS

European Patent Office, Supplementary European Search Report with written opinion in application No. EP 17 82 8207, dated Dec. 3, 1019, 7 pages, Munich Germany.

*Primary Examiner* — Mark R Wendell
(74) *Attorney, Agent, or Firm* — Marshall & Melhorn, LLC

(57) ABSTRACT

A vehicle seat includes a seat base and a backrest. A seat base track arrangement has a fixed track and a moveable track that is moveable along the fixed track. The seat base fixed track is connected to a vehicle seat support or fore/aft track to adjust an entire vehicle seat position. The seat base moveable track is connected to the seat base. A backrest track arrangement has a backrest fixed track and a backrest moveable track that is moveable along the backrest fixed track. The backrest fixed track is connected to a vehicle (Continued)

backrest support. A link arm pivotably links the seat base and the backrest. A seat base pivot connection is formed between the link arm and the seat base. A link arm and backrest pivot connection is formed between the link arm and the backrest and the moveable track.

17 Claims, 14 Drawing Sheets

(51) Int. Cl.
*B60N 2/12* (2006.01)
*B60N 2/30* (2006.01)

(58) Field of Classification Search
USPC ............... 297/317, 331, 336, 340, 341, 343; 296/65.01
See application file for complete search history.

(56) References Cited

U.S. PATENT DOCUMENTS

| | | |
|---|---|---|
| 6,554,360 B1 | 4/2003 | Wilke et al. |
| 6,926,364 B2 | 8/2005 | Cooley et al. |
| 7,229,118 B2 | 6/2007 | Saberan et al. |
| 7,270,371 B2 | 9/2007 | Adragna et al. |
| 7,568,764 B2 | 8/2009 | Harper et al. |
| 8,662,561 B2 | 3/2014 | Runde et al. |
| 9,132,750 B2 | 9/2015 | Jaehner et al. |
| 9,573,490 B1 * | 2/2017 | Poniatowski .......... B60N 2/305 |
| 9,919,626 B2 * | 3/2018 | Goodhall ............. B60N 2/3031 |
| 10,065,536 B2 * | 9/2018 | Poniatowski ........ B60N 2/2245 |
| 10,829,018 B2 * | 11/2020 | Burton ................ B60N 2/2209 |
| 2014/0265501 A1 | 9/2014 | Line et al. |
| 2019/0168640 A1 * | 6/2019 | Kapusky .............. B60N 2/0825 |

* cited by examiner

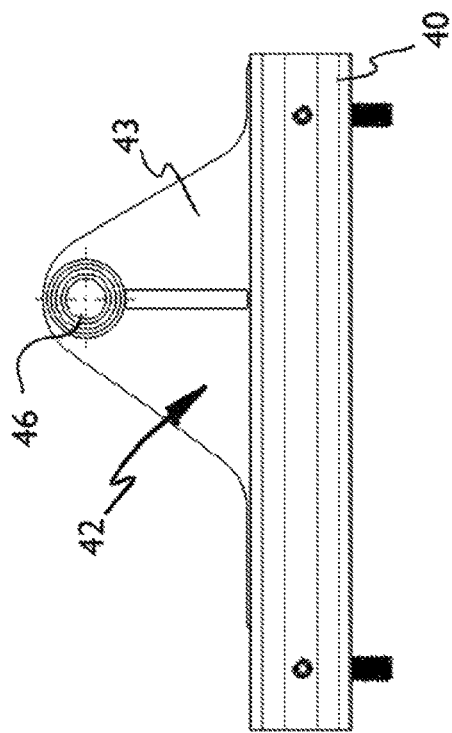
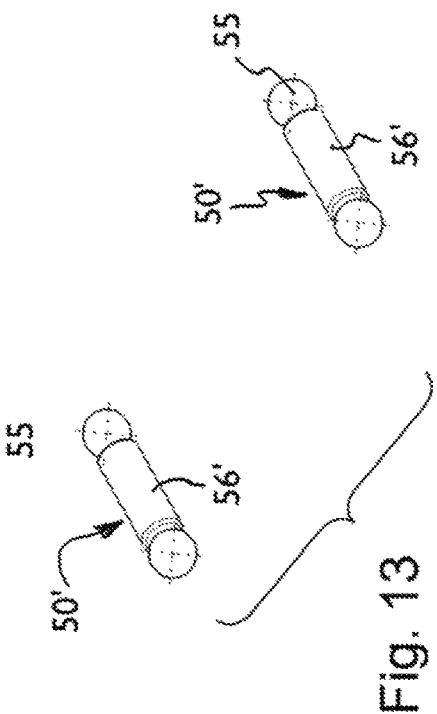
Fig. 11
Fig. 13
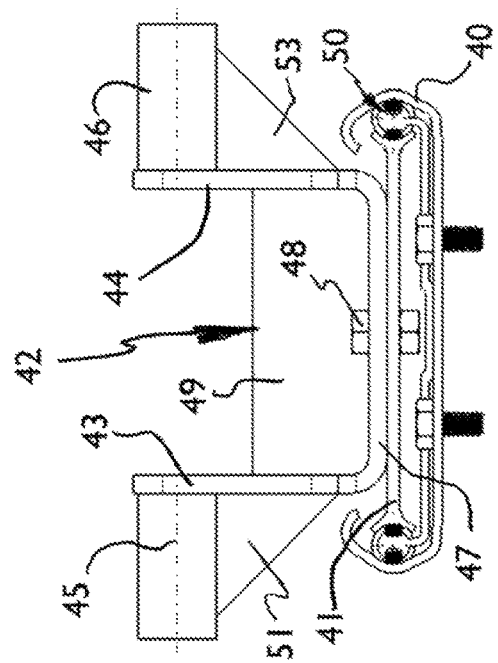
Fig. 10
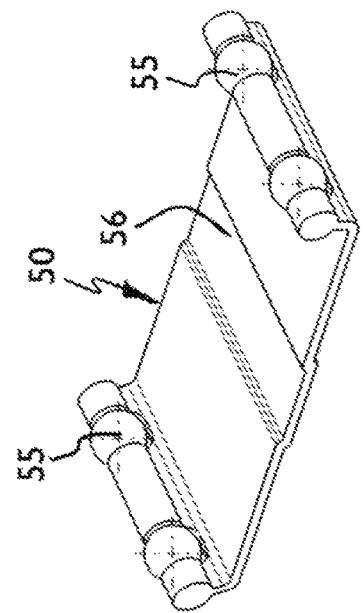
Fig. 12

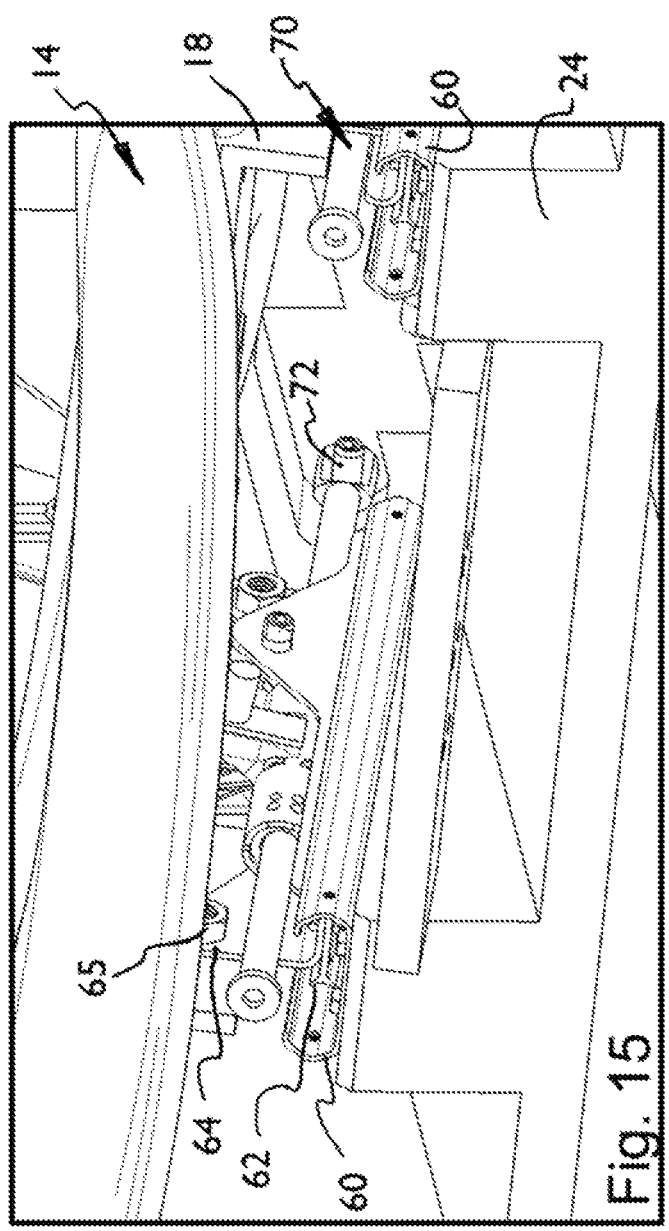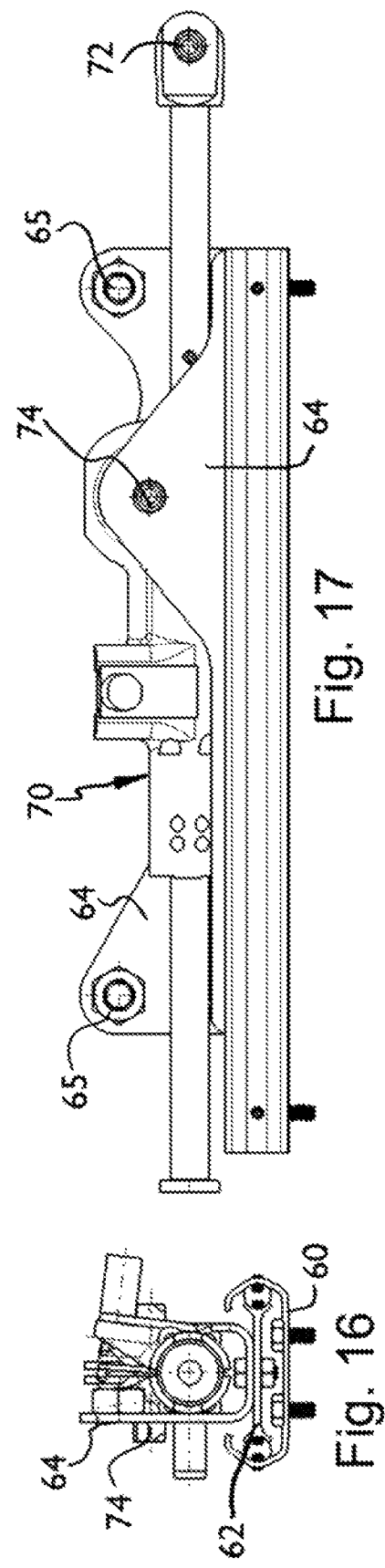

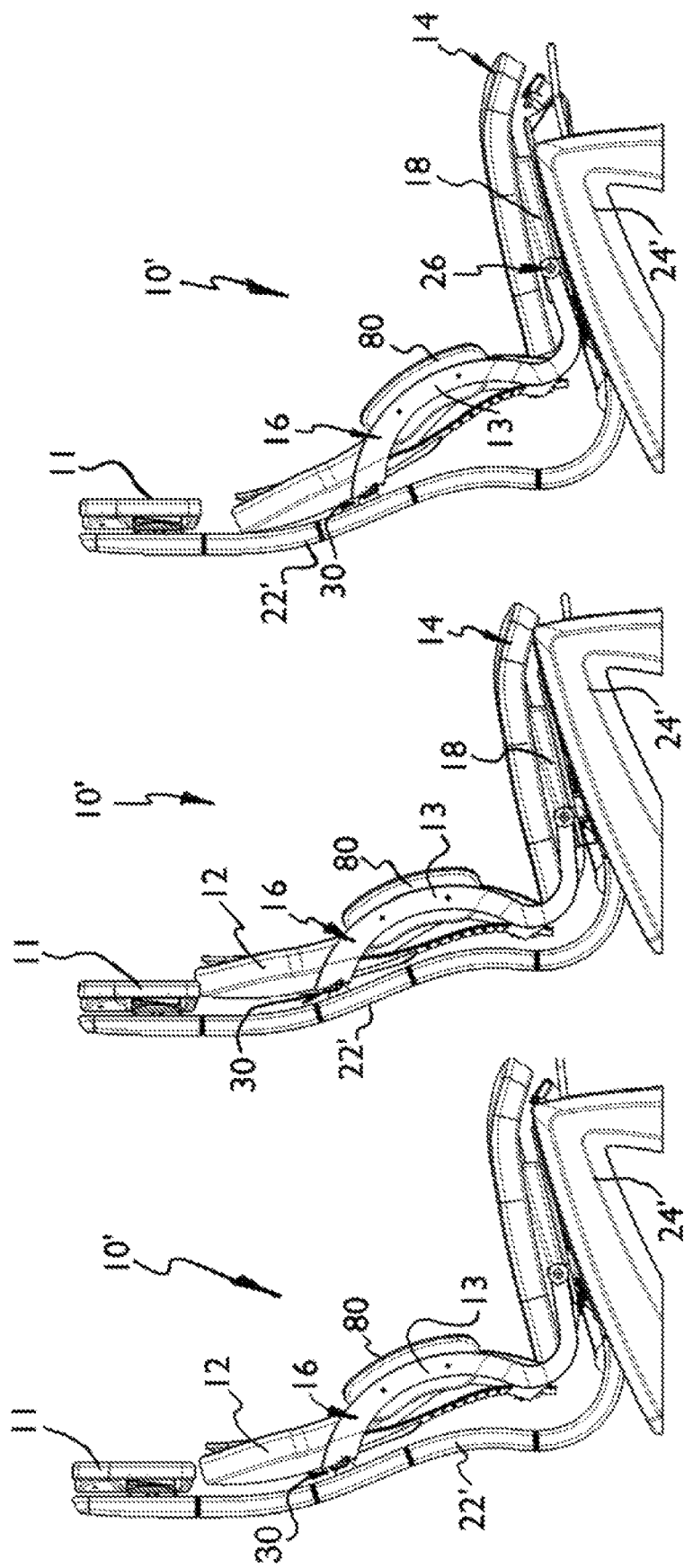

SLOUCH SEAT WITH LINK ARM

CROSS REFERENCE TO RELATED APPLICATIONS

This application is a United States National Phase application of International Application PCT/US2017/041151, filed Jul. 7, 2017, and claims priority of U.S. provisional application 62/362,241 filed, Jul. 14, 2016, the entire contents of which are incorporated herein by reference.

TECHNICAL FIELD

The present invention relates generally to vehicle seats and more particularly to slouch seats, particularly for vehicles such as automobiles and airplanes.

TECHNICAL BACKGROUND

Vehicle seats known as slouch seats have been used in automobiles, particularly as second row or rear row seats. These may be used for example with pickup trucks that have a fixed rear wall of the cab or potentially even with sedans which have a fixed bulkhead, separating the passenger compartment from the rear trunk. Such a rear wall of the truck cab or the rear bulkhead of a sedan prevents a backrest (seat back) of the vehicle seat from reclining relative to a fixed pivot point of the seat base (cushion). Slouch seats may also be used in airplanes and in ground mass transportation such as in trams and trains. Such a slouch seat may include two separate back frames, a moving frame and a fixed frame. Relative movement between these two frames occurs during positioning of the slouch seat from an upright to a semi-reclined position. The fixed frame may be a part of or attached to the vehicle, such as being a part of the rear wall of a truck or a bulkhead of a sedan.

Although there are various configurations to provide a slouch seat, many slouch seat configurations provide for a backrest with a lower portion that slides forward as the upper portion slides downwardly. This typically also includes a forward movement of the seat base. However, the movement of the backrest and the seat base may generate relative movement with respect to the seat occupant. This relative movement is sometimes termed shirt sheer, a sliding movement of the front surface of the backrest relative to the occupant. In a conventional seat, the recliner (pivot fitting) would be placed at the bottom of the backrest (seat back) and the backrest rotates rearward about the pivot fitting. As the seat back rotates rearward, there is relative motion between the seat back surface and the back of the occupant which can cause the shirt shear.

SUMMARY OF THE INVENTION

An object of the present invention is to provide a vehicle slouch seat that allows a full range of adjustment including allowing an occupant to recline (slouch) in a fluid motion that does not cause any type of shirt shear.

It is further an object of the invention to provide a vehicle seat which allows a recline (slouch) adjustment based on a configuration which is robust, stable and simple to manufacture.

According to the invention, a vehicle seat is provided comprising a seat base, a backrest, a seat base track arrangement comprising a fixed track and a moveable track that is moveable along the fixed track, the fixed track being connected to a vehicle seat support and the moveable track being connected to the seat base and a backrest track arrangement comprising a backrest fixed track and a backrest moveable track that is moveable along the backrest fixed track, the backrest fixed track being connected to a vehicle backrest support. A link arm is provided with a seat base pivot connection between the link arm and the seat base and a link arm and backrest pivot connection between the link arm and the backrest and the moveable track.

With the vehicle seat according to the invention, shirt shear is avoided. The vehicle seat slide system reduces or prevents shirts shear because the backrest (seat back) and seat base (cushion) slide with the occupant's movement as the occupant slouches/reclines. With the invention no conventional recliner (pivot fixture) is required, that is typically found at the bottom or lowermost portion of the backrest. The seat structure also does not need to move rearward. This is particularly advantageous as to rear seats adjacent to a cab rear wall or adjacent to a bulkhead. More importantly as the vehicle backrest moves from a full up to slouch position, there is no motion between the backrest and the occupant's shirt as the vehicle seat moves with the body of the occupant. The seat base and seat base track arrangement are a part of one slide system and the backrest and backrest track arrangement are a part of another slide system. The two slide systems work together to recline/slouch the occupant like a recliner but the two motions match the natural motion of the occupant's body preventing issues like shirt shear.

The link arm between the cushion track and the backrest (seat back) track provides the desired kinematic motion. The link arm pivot locations and the general setup of the vehicle seat structure create a ratio of movement between the seat base track arrangement track travel and the backrest track arrangement track travel that matches the natural movement of the occupant as he or she reclines/slouches. The system is balanced enough between the tracks such that no return springs are required. The travel ratio between the seat base track arrangement track travel and backrest track arrangement track travel may advantageously be about 2:1 (the seat base moves about twice the distance the backrest moves). No pulley system is required to maintain this ratio. The link arm provides this connection that establishes the ratio.

The backrest may be a so called live back seat back. Such a live back comprises a plastic panel that flexes with back movement of the occupant. The live back seat back may be pivotably connected to the moveable track independently of the pivot connection of the link arm and the moveable track. The live back seat back may be moveably connected to the link arm at a lower sliding link arm and backrest connection. The backrest may also comprise a conventional rigid seat back structure, shell or frame.

The link arm pivot at the seat base (cushion) is placed below the hip-point or H-point of the occupant to help provide a fluid motion for the body in this range of recline (slouch) travel. The H-point (or hip-point) is the theoretical, relative location of an occupant's hip: specifically the pivot point between the torso and upper leg portions of the body—as used in vehicle design, automotive design and vehicle regulation. The H-point is based on the hip joint of a 50th percentile male occupant, viewed laterally. The H-point is relevant to the global technical regulations (GTR) and the Society of Automotive Engineers (SAE) J1100 Interior Measurement Index, which sets parameters for such measurements as H30 (H-point to vehicle floor); H5 (H-point to pavement surface), H61 (H-point to interior ceiling) and H25 (H-point to window sill).

Although the link arm pivot is preferably placed at the seat base (cushion) below the hip-point or H-point of the occupant, with different backrest configurations, the pivot may be disposed higher or lower, along the hip-point line or H-point plane (a vertically extending line or plane that passes through the H-point). The link arm backrest pivot location may be in different locations depending upon the backrest and seat base type, but preferably the location is lower or higher along the hip-point line or H-point plane. The location of the pivot may be shifted to some degree from the H-point line provided the ratio between the seat base track arrangement track travel and backrest track arrangement track travel is maintained at about 2:1.

The link arm and backrest pivot connection may comprise a link arm bushing, a backrest bushing and a track bracket fixed to the backrest moveable track. The track bracket has a pivot shaft engaging the link arm bushing for pivoting movement of the link arm relative to the track bracket and engaging the backrest bushing for pivoting movement of the backrest relative to the track bracket. The link arm may be connected to or may define the link arm bushing and a further link arm bushing. The backrest may have the backrest bushing and a further backrest bushing. The track bracket may comprise a first bracket flange, supporting the pivot shaft that engages the link arm bushing, the backrest bushing and a second bracket flange, supporting a further pivot shaft that engages the further link arm bushing and the further backrest bushing.

The link arm may comprise a right side link arm portion with a right lower link arm extending along a portion of a length of the seat base to a link arm right lower pivot bushing at a H-point along the length of the seat base. The link arm may further comprise a left side link arm portion with a left lower link arm extending along a portion of a length of the seat base to a link arm left lower pivot bushing at a H-point along the length of the seat base. The seat base may comprise a frame part with a connected seat base right side pivot bushing and a connected seat base left side pivot bushing. The seat base pivot connection may comprise a right side seat base pivot connection with a right pivot shaft supported by the link arm right lower pivot bushing and the seat base right side pivot bushing. The seat base pivot connection may further comprise a left side seat base pivot connection with a left pivot shaft supported by the link arm left lower pivot bushing and the seat base left side pivot bushing.

The right side link arm portion may form a right side bolster, with bolster foam and trim connected to the right side link arm portion. The left side link arm portion may form a left side bolster, with bolster foam and trim connected to the left side link arm portion.

The backrest has a side profile shape. The right side link arm portion may have a side profile shape that follows a contour of the side profile shape of the backrest. The left side link arm portion may have a side profile shape that follows the contour of the side profile shape of the backrest.

The link arm—with the link arm and backrest pivot connection, the right side seat base pivot connection and the left side seat base pivot connection—cooperates with the seat base, seat base track arrangement, backrest and the backrest track arrangement to form a balanced system. A travel ratio between the seat track arrangement and the backrest track arrangement is between 1.8:1 and 2.2:1 and is preferably about 2:1.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is an end view of the backrest track arrangement and pivot bracket of the vehicle seat according FIG. 1;

FIG. 11 is a side view corresponding to FIG. 10;

FIG. 12 is a perspective view of a ball bearing arrangement including a ball cage for the track arrangements of the vehicle seat according to the invention;

FIG. 13 is a perspective view of a ball bearing arrangement including a straw spacer for the track arrangements of the vehicle seat according to the invention;

FIG. 15 is a partial perspective detail view showing the seat base track arrangement and slouch locking device of the vehicle seat of FIG. 1;

FIG. 16 is an end view showing a seat base track arrangement with connected locking device and slouch adjuster of the vehicle seat of FIG. 1;

FIG. 17 is a side view of the arrangement of FIG. 13;

FIG. 19A is a side view showing a slightly modified vehicle seat in a design position;

FIG. 19B is a side view showing the vehicle seat of FIG. 19A in a seat full upright position; and FIG. 19C is a side view showing the vehicle seat of FIG. 19A in a seat full recline position.

DESCRIPTION OF THE PREFERRED EMBODIMENTS

Figure 1:
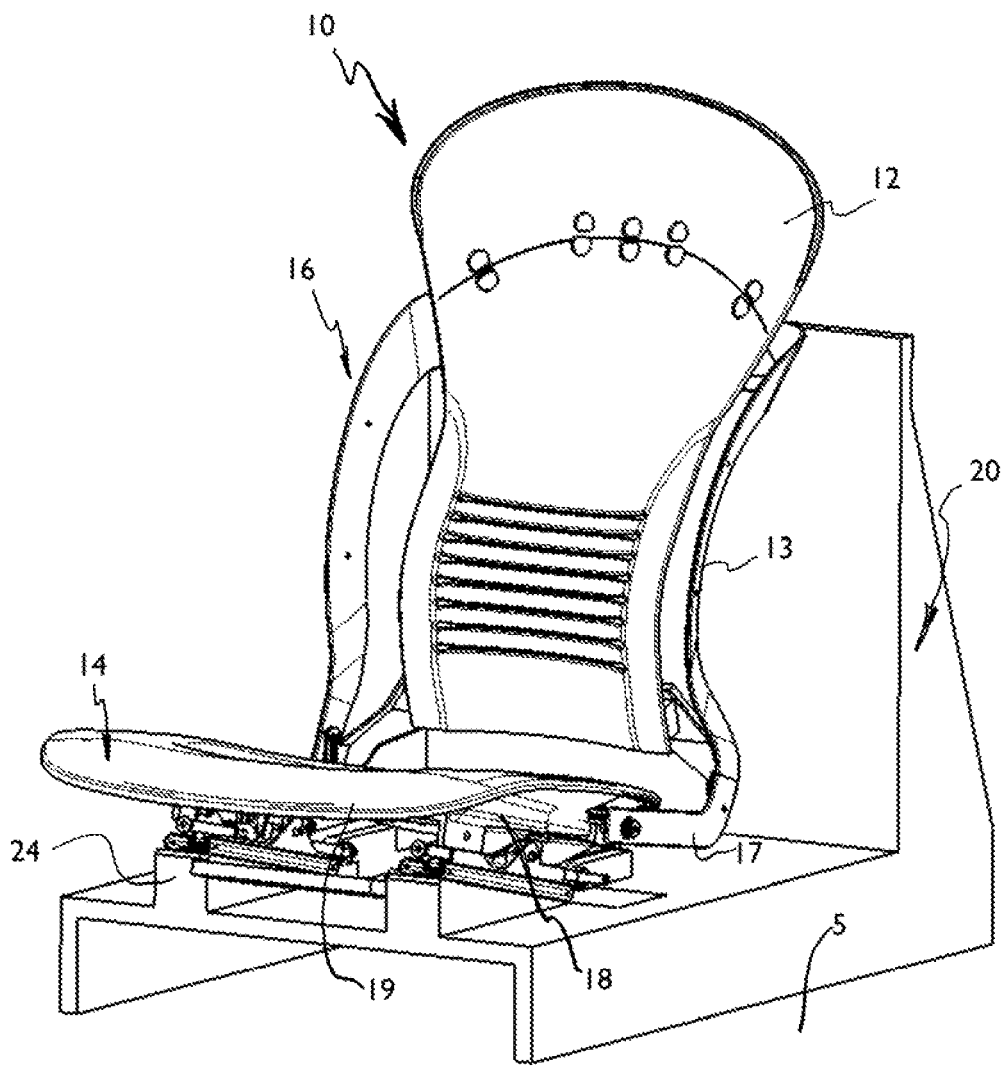
FIG. 1 is a perspective view of an embodiment of a vehicle seat according to the invention.

Referring to the drawings, a vehicle seat generally designated 10 is shown comprising a backrest (seat back) 12 and a seat base (cushion) 14. A link arm 16 connects the backrest 12 and the seat base 14. The backrest 12 and the seat base 14 are supported on a support frame 20. The support frame 20 may be fixed to a vehicle floor 5. The support frame 20 may also be fixed on a movable track such that the support frame 20 may itself be fixed in a position (such as in a longitudinal set position—along a direction of travel) and displaced along a track, that is fixed in the vehicle floor 5, to change a longitudinal position setting of the entire vehicle seat. The seat base 14 comprises a seat base frame 18 with a cushion upper part 19. The seat base 14 may have other configurations including a seat base frame that is formed of side brackets and cross members. The backrest 12 is a so called live back seat back. The backrest 12 may instead comprise a shell supporting one or more foam pieces covered by trim or may comprise a frame supporting one or more foam pieces covered by trim.

The vehicle seat support, as a support frame 20, includes vehicle backrest support 22 and a connected vehicle seat base support 24. The support frame 20 may include the backrest support 22 separate from the seat base support 24. The vehicle seat support may have the backrest support 22 formed as part of the vehicle, such as the rear wall of the cabin of a pickup truck or such as the bulkhead separating the passenger compartment from trunk space. The vehicle seat support may be provided with the base support 24 formed as part of the vehicle floor 5 or may be a separate support part connected to the vehicle floor 5.

The vehicle seat support may be provided with a longitudinal track adjuster arrangement as the base support 24, with the seat base track arrangement mounted on a moveable track of the longitudinal track adjuster arrangement. In such a case, the longitudinal track adjuster arrangement is mounted on the vehicle floor 5. The vehicle seat support may be provided with the base support 24 formed as a separate support part connected to the vehicle floor 5. The support frame 20 or the base support 24 may be connected to the floor 5 via another set of tracks (e.g., the longitudinal track adjuster arrangement is for longitudinal adjustment in fore/aft direction relative to travel) for a position adjustment of the entire vehicle seat 10. Providing a longitudinal adjustment arrangement of the frame 20/22/24 may be particularly important for use of the vehicle seat 10 as a drivers seat for positioning relative to the steering wheel etc.

The link arm 16 is connected to the seat base 14 by a seat base pivot 26. The seat base pivot 26 is preferably positioned along a length of the seat base 14 and below a hip-point or H-point of the occupant. The position of the H-point is determined with respect to a longitudinal direction (typically the direction of vehicle travel) of the cushion upper part 19. The pivot 26 may be slightly higher or lower along an imaginary vertical line H or vertical plane H passing through the H-point, depending upon the exact seat base configuration, depending upon the backrest, and depending upon the seat base type. Advantageously, the location of the seat base pivot is lower or higher along the hip-point or H-point vertical plane H.

Figure 2:
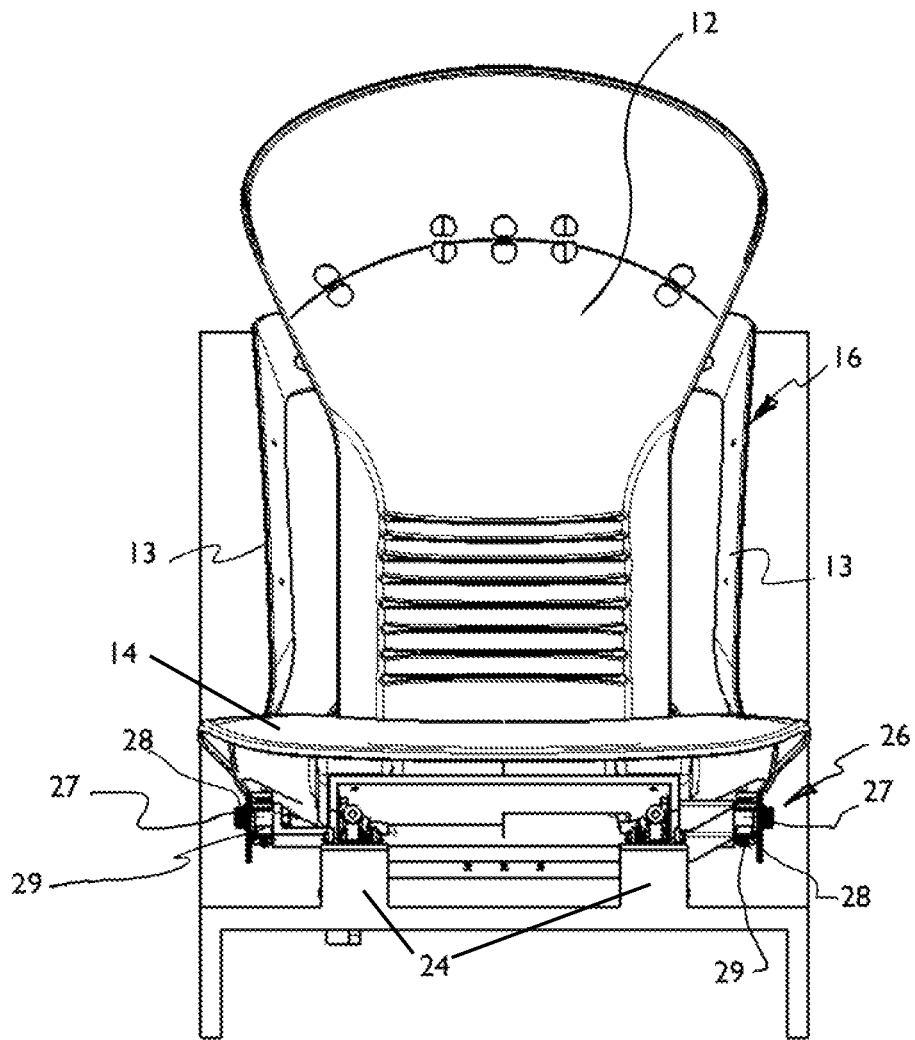
FIG. 2 is a front view of the vehicle seat according to FIG. 1.

The seat base pivot 26 is comprised of a seat/link arm pivot shaft or pin 27 that forms a bearing with a link arm lower pivot bushing 28, formed at a lower portion 17 of the link arm 16 (FIG. 2). A seat base pivot bushing 29 is formed in the seat base frame 18, in particular in a side bracket or side portion of the seat base frame 18. The seat base pivot bushing 29, formed in the seat base frame, cooperates with the pivot shaft 27 to form another bearing of the seat base pivot 26. The seat base pivot 26 may also be formed with the pivot shaft 27 fixed to one of the seat base frame 18 and the link arm lower portion 17 and with the other of the seat base frame 18 and the link arm lower portion 17 having the bushing. Each seat base pivot 26 then would have one bearing instead of having two bearings.

Figure 3:
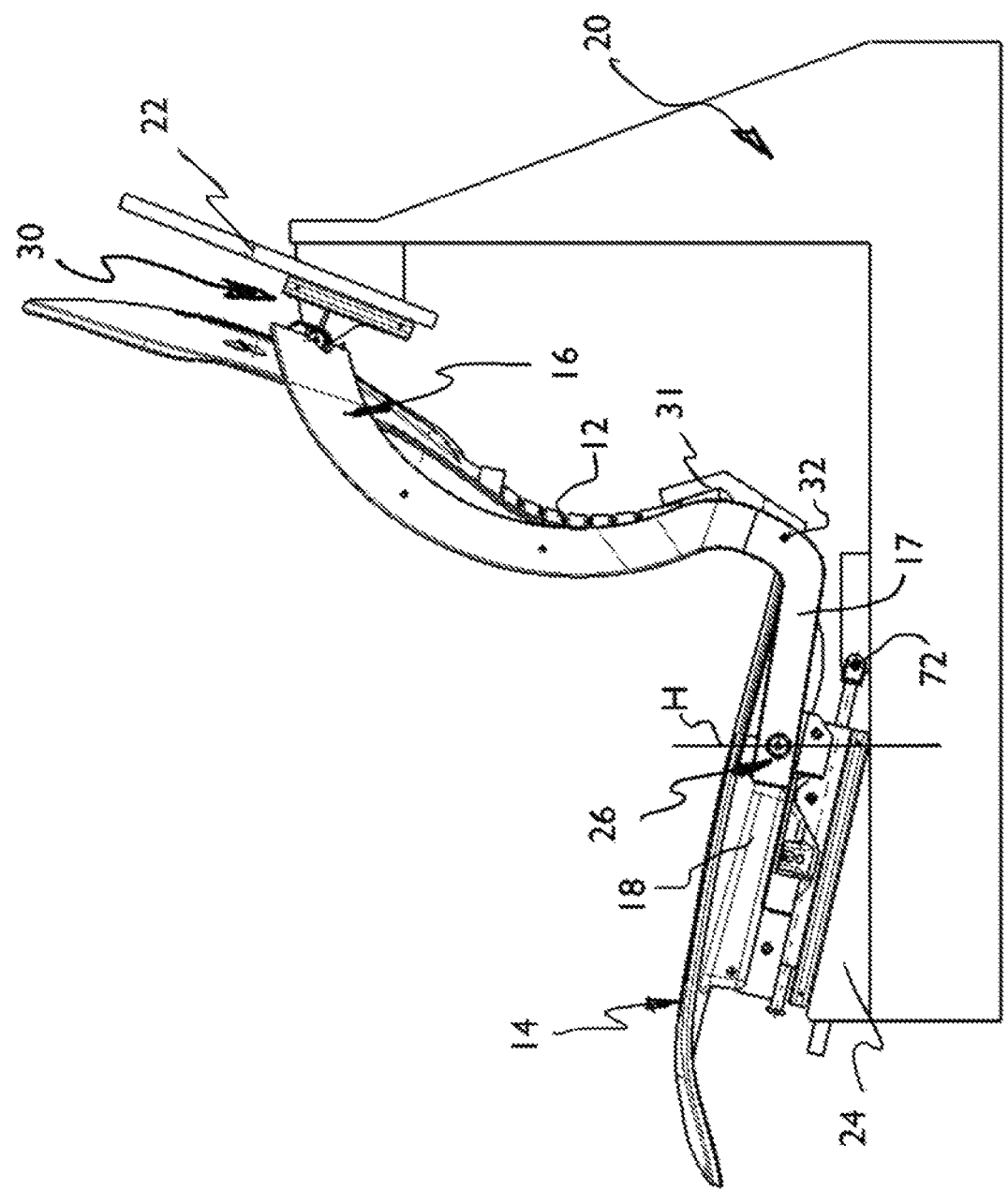
FIG. 3 is a side view of the vehicle seat according to FIG. 1.
Figure 4:
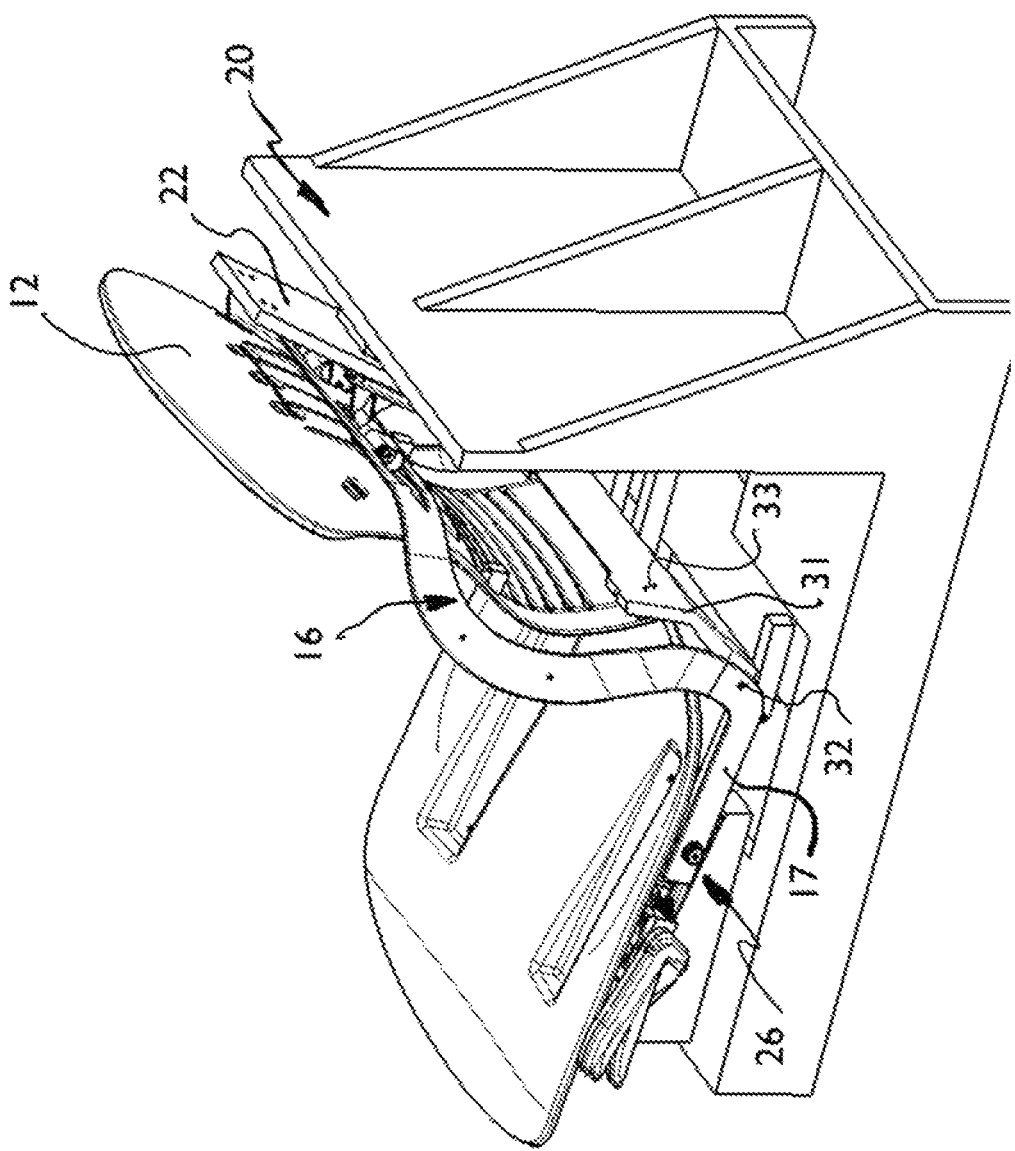
FIG. 4 is an upper rear perspective view of the vehicle seat according to FIG. 1.
Figure 9:
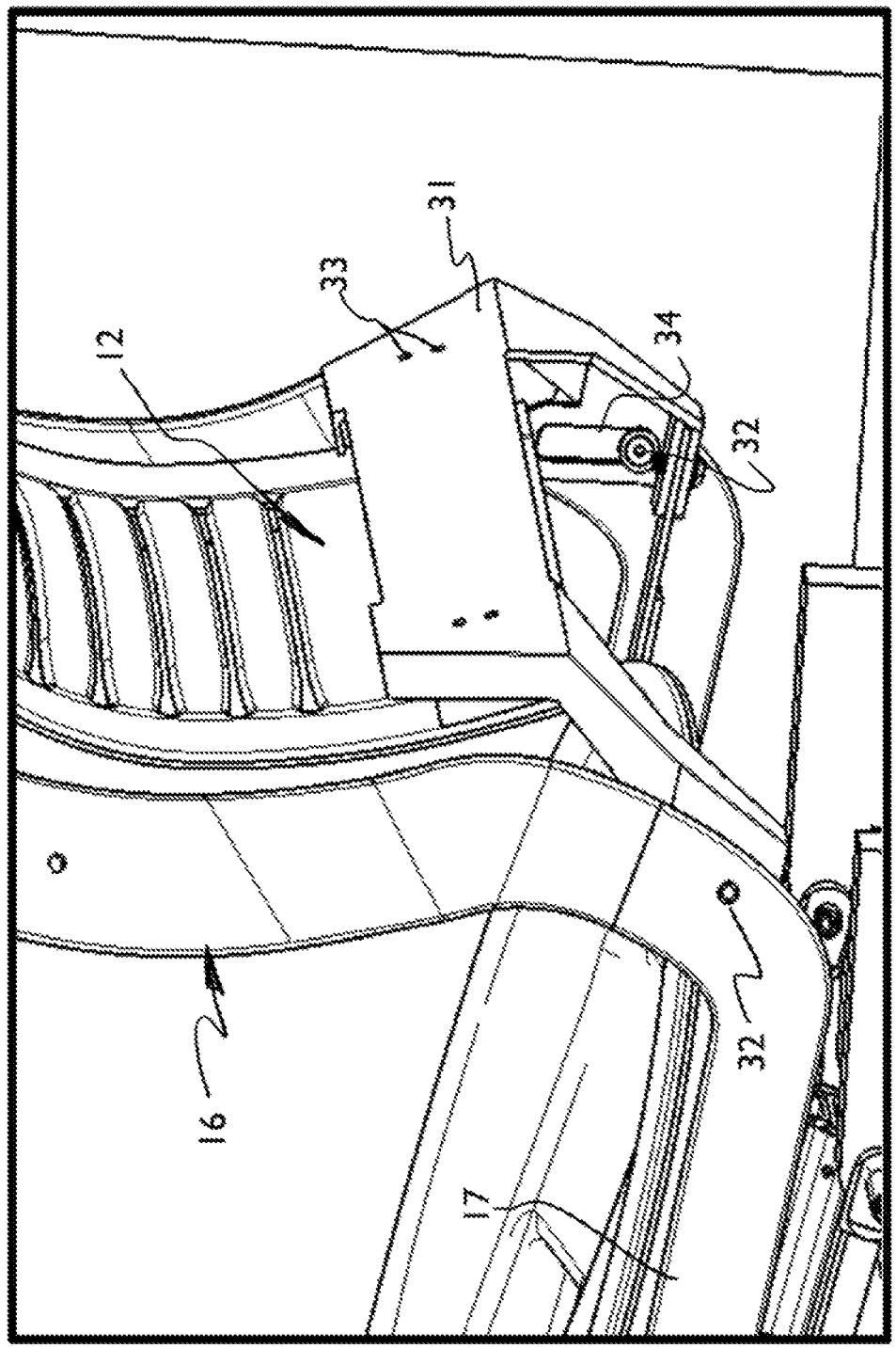
FIG. 9 is a partial upper rear perspective detail view of the backrest and link arm of the vehicle seat according to FIG. 1.

The link arm 16 has an upper portion 15 that extends across a back side of the backrest 12 and at each side has mid-portions (right side link arm portion and left side link arm portion or mid-portions) 13 that extend downwardly from each side of the upper portion 15. The seat base pivot connection 26 is provided at each side of the vehicle seat 10—a right side seat base pivot connection 26 and a left side seat base pivot connection 26. A lower link arm portion 17 extends forward from each of the mid-portions 13 to each seat base pivot 26. FIG. 3 shows one of the seat base pivots 26 between the seat base 14 and the lower link arm portion 17. FIG. 3 also indicates the link arm and backrest pivot connection that is generally designated 30. The link arm and backrest pivot connection 30 is between the upper link arm cross portion 15, the backrest 12 and the backrest track arrangement. As shown in FIGS. 3, 4 and 9, a lower portion of the backrest 12 is connected to a crossmember 31 via screws or shouldered bolts 33. The crossmember 31 has a slot 34 (FIG. 9) on each side that receives a pin 32 that is supported on the link arm 16 at each lower link arm portion 17. The pin 32 follows the slot 34 on lower cross member to guide any flexing motion of the backrest 12 at both sides. As can be seen in FIGS. 3 and 9, the backrest 12 has a side profile shape and the left side link arm has a side profile shape following (substantially corresponding to) the side profile shape of the backrest 12. The right side link arm has a side profile shape following the side profile shape of the backrest 12.

Figure 5:
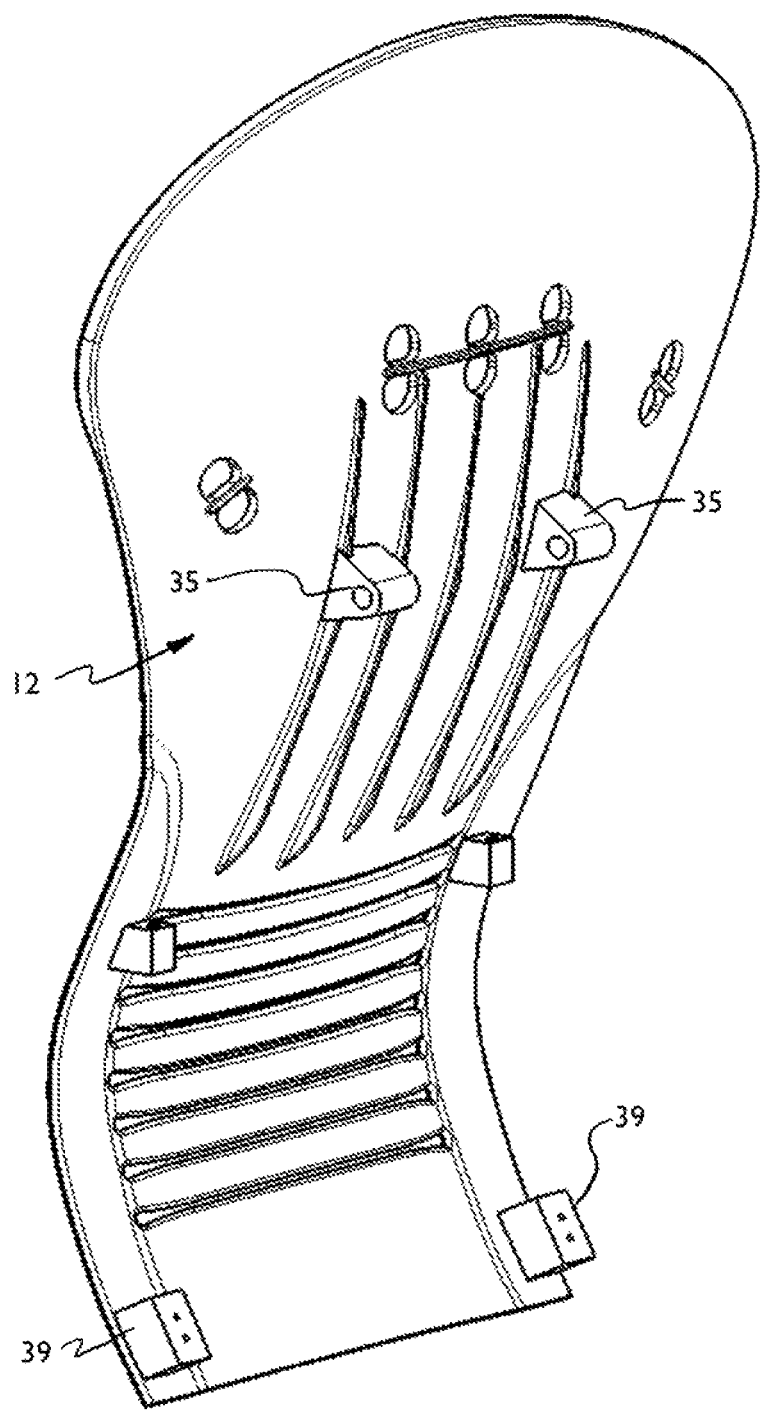
FIG. 5 is an upper rear perspective view of the backrest of the vehicle seat according to FIG. 1.

FIG. 5 shows the backrest 12 of the vehicle seat of FIG. 1. The backrest 12 is a liveback backrest comprising a plastic panel that flexes with back movement of the occupant. The configuration shown, particularly with the independent pivoting of the backrest and the link arm at the link arm relative to the bracket 42 at the backrest pivot 30 and the connection of the lower backrest 12 with the link arm via lower link arm and backrest connection 32 at slot 34 (a sliding link arm 16 and backrest 12 connection) allows some flexing movement of the backrest 12 relative to the link arm 16. There is some relative motion between the lower crossmember 31 and the link arm 16 to allow motion of the flexible backrest 12 in this case. As an alternative the backrest 12 may be a ridged frame structure with foam and trim or a hard shell structure with foam and trim. Such a rigid frame structure or shell structure may be formed integral with or fixed to the cross member 31 or formed as and integral backrest link arm structure with the upper portion 15 and the mid-portion 13 of the link arm 16 fixed to or integral with the backrest 12. Such an integral backrest link arm structure has each of the lower link arm portions 17 extend along aside of the seat base 14 to the pivot 26. In the alternative, with a rigid backrest 12, the lower cross member 31 can be rigidly attached to the link arm 16 on each side. The connection of the backrest 12 to the crossmember 31 is at two blocks 39 with holes. The shouldered bolts 33 pass through each hole of the blocks 39 and into the backrest 12. The backrest 12 can tilt/flex about these pivot blocks. If backrest 12 is ridged, the backrest 12 may be directly attached to the link arm 16. The backrest 12 may then move with the link arm 16. The slot 34 connection with pin 32, that allows tilting, is then not required.

Figure 6:
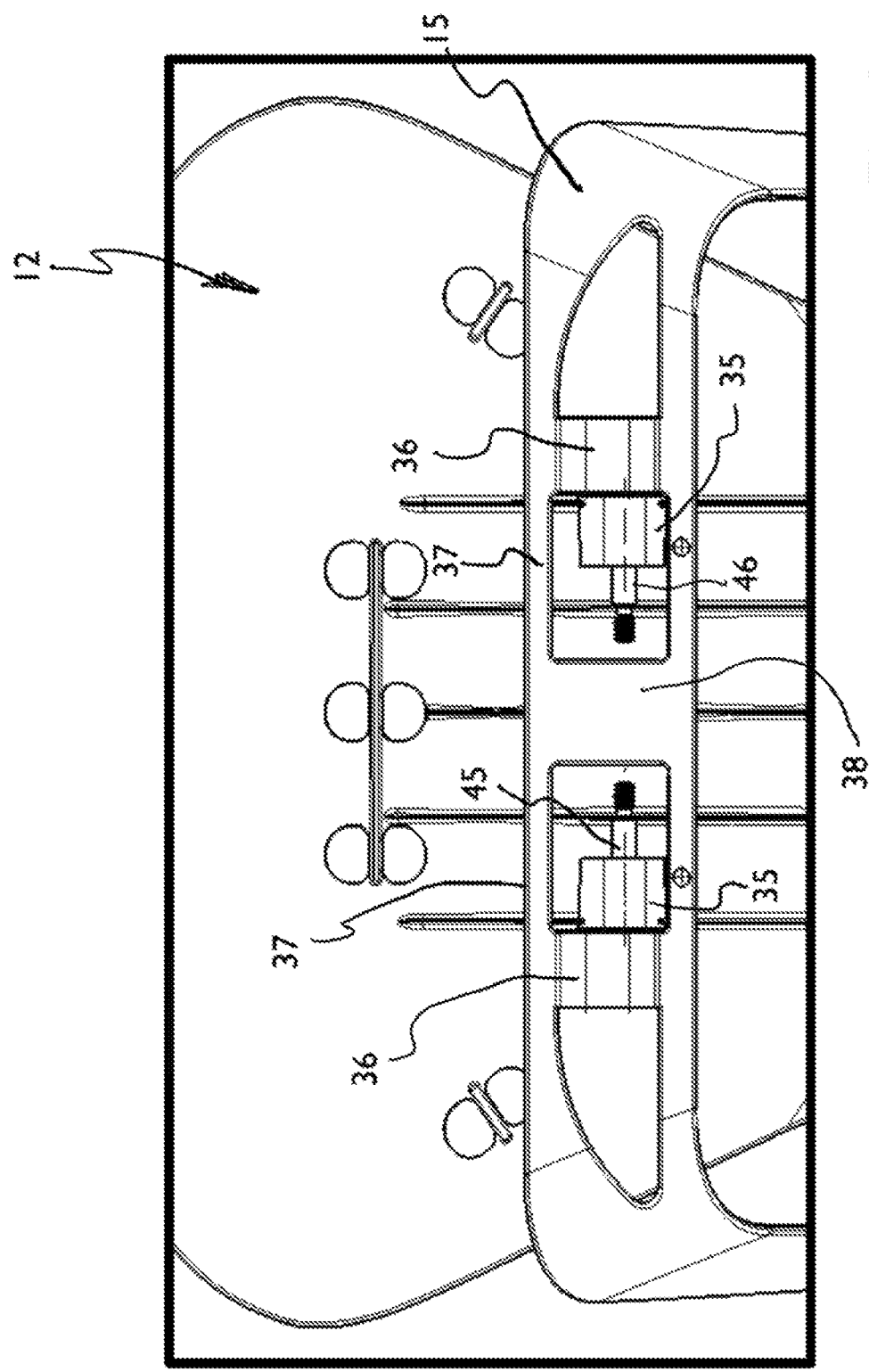
FIG. 6 is a partial rear detail view of the backrest of the vehicle seat according to FIG. 1, not showing a support structure.
Figure 7:
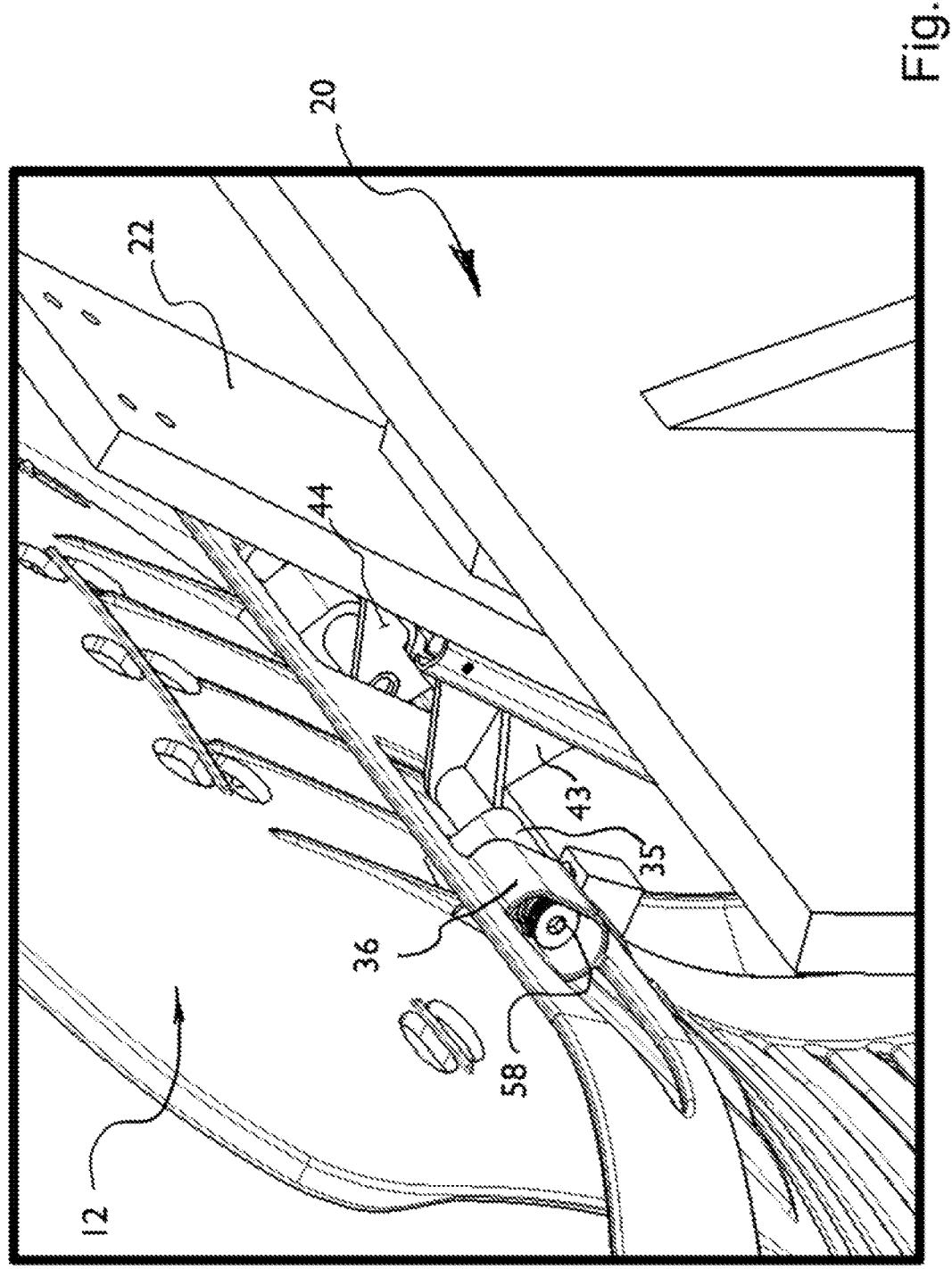
FIG. 7 is a partial upper rear perspective detail view of the backrest and support structure of the vehicle seat according to FIG. 1.
Figure 8:
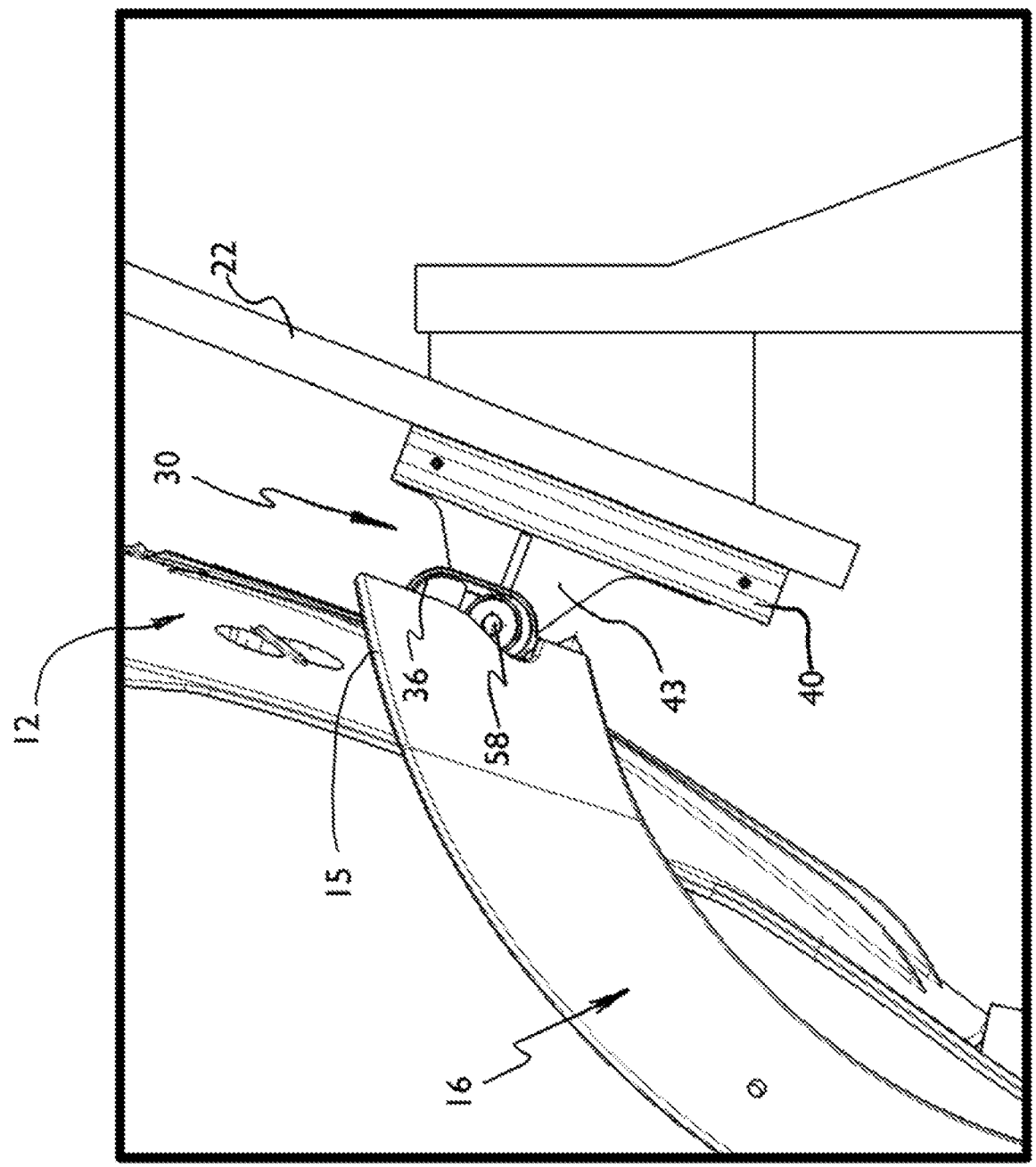
FIG. 8 is a partial side detail view of the backrest, link arm and support structure of the vehicle seat according to FIG. 1.

The link arm 16 and the backrest 12 are connected to the vehicle backrest support 22 by the link arm and backrest pivot connection 30 (see FIG. 8). The pivot connection 30 is comprised of link arm bushings 36 that forms a part of the link arm 16 and backrest bracket bushings 35 that forms a part of the backrest 12 (see FIG. 7). As seen in FIG. 6, the upper part 15 of the link arm 16 may have a plurality of openings including pivot bracket openings 37 separated by a central web 38. A backrest fixed track 40 is fixed at the vehicle backrest support 22. The backrest fixed track 40 forms part of the backrest track arrangement that also includes a backrest movable track 41. A pivot bracket 42 (FIG. 10) is mounted on the moveable track 41. The pivot bracket 42 includes a left side (first) pivot support flange 43 and a right side (second) pivot support flange 44. The pivot bracket openings 37 of the link arm upper part 15 provide access space for the backrest bracket bushings 35 and the pivot support flanges 43 and 44. A left side pivot socket 45 extends from the pivot support flange 43 and a right side pivot socket 46 extends form the pivot support flange 43. A pivot pin 58 passes through one of the link arm bushings 36 and one of the backrest bracket bushings 35 and is fixed to the pivot socket 45. Another pivot pin 58 passes through the other of the link arm bushings 36 and the other of the backrest bracket bushings 35 and is fixed in pivot socket 46. This configuration allows each of the link arm 16 and the backrest 12 to pivot relative to the pivot bracket 42, which is fixed on the moveable track 41. This is only needed in the case of a backrest 12 that must flex relative to the backrest. With a rigid backrest, e.g., a shell or rigid frame, the link arm 16 and backrest 12 may be fixed together or be integrally formed and may together have a link arm and backrest bushing that pivots relative to the pivot bracket 42. For the link arm and backrest pivot connection 30, the pivot shafts and bushings may be reversed—the bushings or bushing of the backrest 12 and the link arm 16 may instead be one or more pivot shafts and the pivot shafts 56 and sockets 45 and 46 of the bracket 42 may instead be one or more bushings.

FIG. 10 shows the pivot bracket 42 fixed at base 47 on the backrest movable track 41 by nut and bolt connection 48. The bracket 42 includes the pivot support flanges 42 and 43 that extend upwardly from the base 47. The pivot support flanges 42 and 43 are connected by a cross web 49. The pivot support flanges 42 and 43, in cooperation with webs 51 and 53, support each of the pivot sockets 45 and 46. The backrest movable track 41 is mounted relative to backrest fixed track 40 via a ball bearing arrangement 50. The ball bearing arrangement 50 is comprised of ball bearings 55 and the ball cage 56. The ball bearings 55 are positioned via the ball cage 56 to form the ball bearing arrangement 50. Such a ball cage 56 may also be used with the seat base track arrangement discussed below. However, as the backrest track arrangement is vertical or nearly vertical, the positioning of the ball bearings 55 via the ball cage 56 is advantageous. In the alternative, a ball bearing arrangement 50' may be provided in which the arrangement 50' is formed by the ball bearings 55 as well as straw spacers 56' (see FIG. 13). Further, the single moveable track 41 of the backrest track arrangement is provided extending laterally (FIG. 10) with bearings 55 at lateral sides. This provides a mounting surface for bracket 42 and reduces the dimension of the track arrangement in a direction extending toward the backrest 12. The single fixed track 40 of the backrest track arrangement engages the bearings 55 at the lateral sides of the single moveable track 41.

Figure 14A:
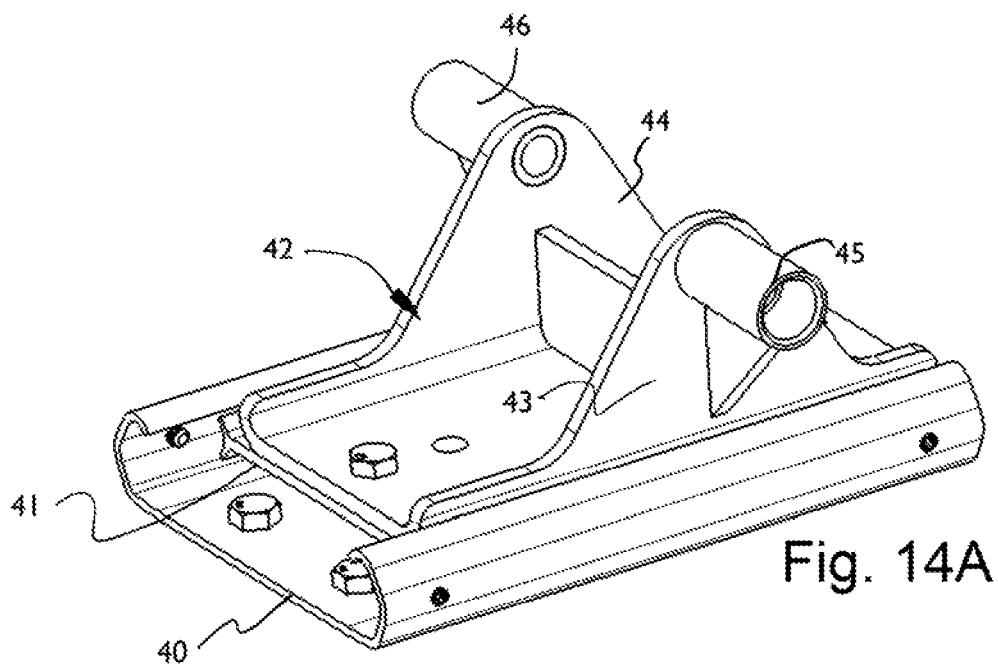
FIG. 14A is a perspective view of the backrest track arrangement and pivot bracket shown in a backrest design position.
Figure 14B:
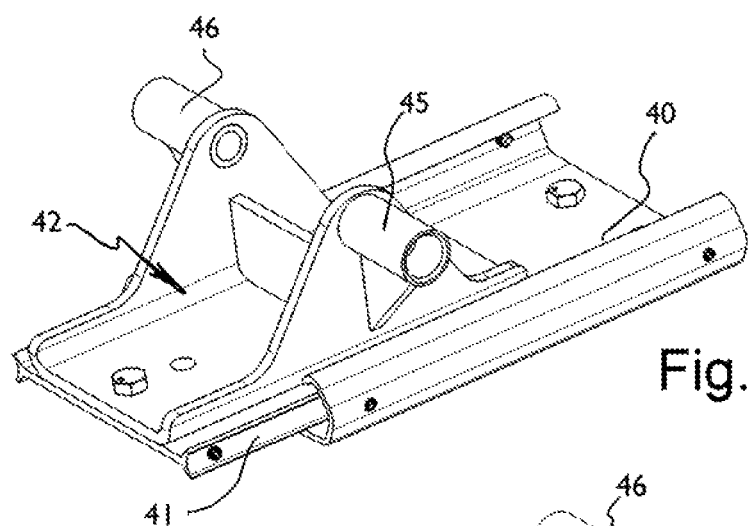
FIG. 14B is a perspective view of the backrest track arrangement and pivot bracket shown in a full recline position.
Figure 14C:
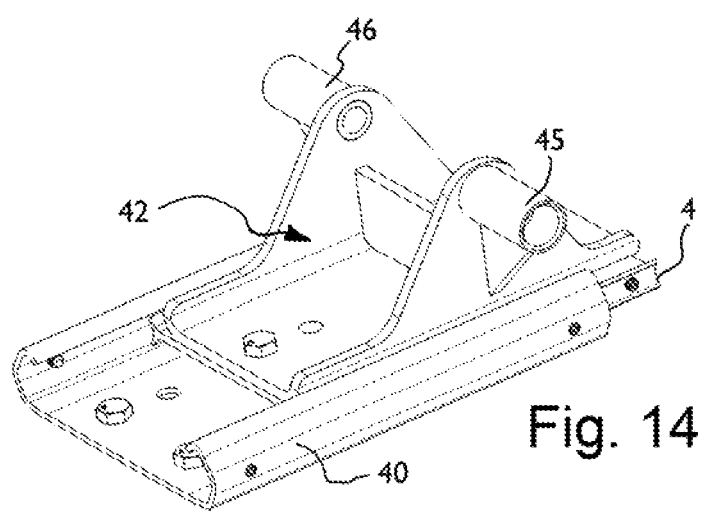
FIG. 14C is a perspective view of the backrest track arrangement and pivot bracket shown in a full upright position.

The pivot pin 58 may have a smooth outer bearing surface in a region that contacts the bushing 36 and the bushing 37 and may have a threaded screw end for fixing the pivot pin 58 to the pivot bracket 42. The pivot bracket 42 is connected to the link arm 16 and the backrest 12 by passing the pivot pin 58 through the respective bushing 36 and through the respective bushing 37 until the threaded end engages the pivot socket 45 or 46 respectively. The pivot sockets 45 and 46 comprise threaded bores allowing the threaded ends of the pivot pins 58 to be fixed to the pivot bracket 42. After assembly, each pivot pin surface forms a pivot shaft of the pivot arrangement 30, to each respectively pivotably support the link arm 16 via the link arm bushings 36 and the backrest 12 via the backrest bracket bushings 35. The pivot bracket 42 with backrest movable track 41 moves relative to the backrest fixed track 42, that is fixed to the support 22. This allows the pivot bracket 42 to occupy a backrest design position FIG. 14A, a full recline position FIG. 14B and a full upright position FIG. 14C.

FIG. 15 shows the seat base 14, the seat support 24 as well as the seat base track arrangement, which comprises the seat base fixed track 60 and seat base movable track 62. The seat base fixed track 60 is fixed on an upper surface of the vehicle seat base support 24. A seat base bracket 64 is fixed on an upper surface of the seat base movable track 62. In the embodiments shown the moveable tracks 62 of the seat base track arrangement is provided extending laterally (FIG. 16) with bearings 55 at lateral sides. This provides a mounting surface for bracket 64 and reduces the dimension of the seat base track arrangement in a direction extending toward the seat base 14. The fixed track 60 of the backrest track arrangement engages the bearings 55 at the lateral sides of the moveable track 62.

Figure 18A:
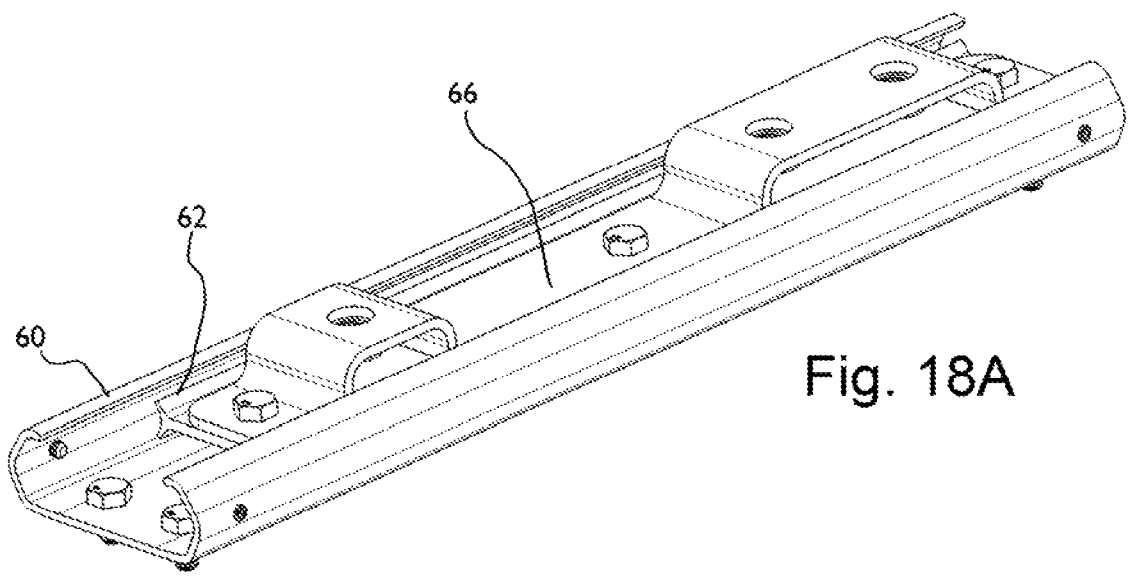
FIG. 18A is a perspective view showing a portion of the seat base track arrangement in a seat base design position.
Figure 18B:
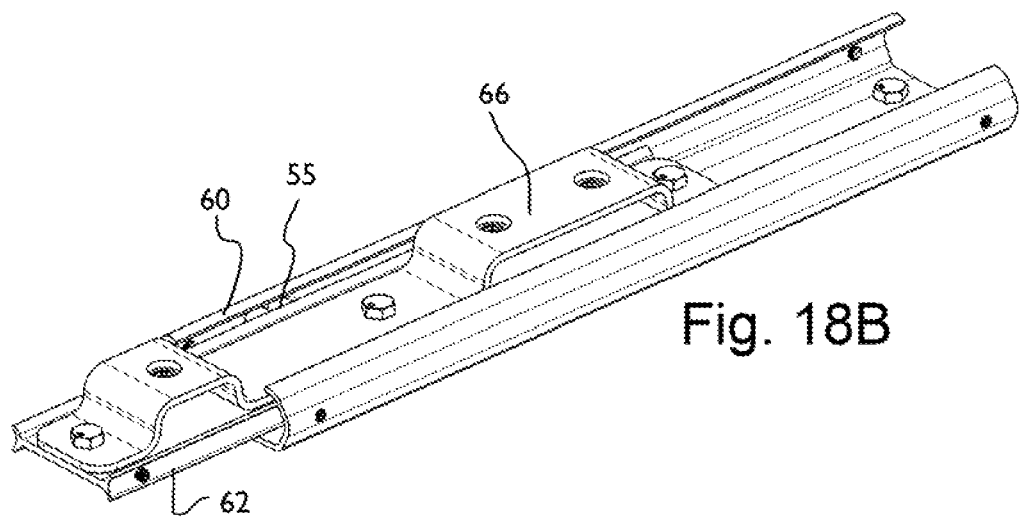
FIG. 18B is a perspective view showing a portion of the sea bass track arrangement in a seat base full recline position.
Figure 18C:
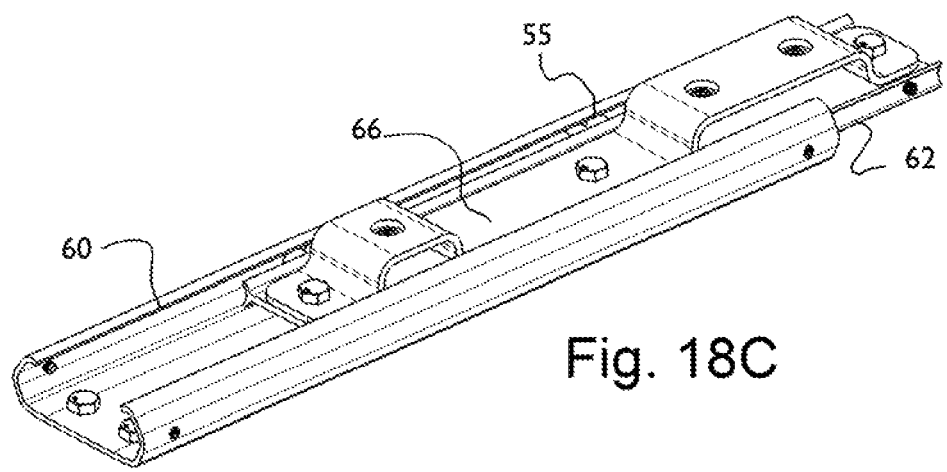
FIG. 18C is a perspective view showing a portion of the seat base track arrangement in a seat base full upright position.

The seat-base bracket 64 is connected by fasteners 65 to the seat base frame 18. A locking device 70, that forms part of slouch adjustor, is connected to the seat base bracket 64 at bracket connection 74. The locking device 70 is also connected to the seat support 24 (FIGS. 3 and 15). The actuation of the locking device 70 allows a locking and a release of the seat base, with movement of the moveable track 62 relative to the fixed track 60. As the link arm 16 connects the seat base 14 and the backrest 12, the actuation of the locking device 70 allows a locking and release of the backrest with movement of the moveable track 41 relative to the fixed track 40. An appropriate actuator, such as a lever, is operatively connected to the locking device 70 to release and lock the locking device 70 to adjust the slouch position. The locking device 70 is a so called linear adjuster having features such as disclosed in U.S. Pat. No. 5,794,470 (which is hereby incorporated by reference in its entirety). As an alternative, the slouch adjuster may include a locking mechanism 70 that comprises a track arrangement with track and locking features used for longitudinal adjusters as disclosed in U.S. Pat. No. 9,132,750 (which is hereby incorporated by reference in its entirety). The backrest and seat base track arrangements may also use tracks with bearings as disclosed by U.S. Pat. No. 9,132,750. Another or similar longitudinal adjusting device may be used as the locking device configuration. This may comprise a manually actuated mechanism or any other (pawl, pin, etc.). The track such adjuster arrangement may also be powered with motor, transmission and lead screw. Further, the slouch adjuster locking mechanism can be provided outside of the region of the seat base track arrangement such as between the tracks. In this case, the seat base frame 18 may be mounted to the movable tracks 62, such as via track support brackets 66 as shown in FIGS. 18 A-C. With each variation of locking device 70, the seat base movable track 62 is movable along the seat base fixed track 60 to position the seat base 14 in a seat base design position FIG. 18A, a seat base full recline position FIG. 18B and a seat base full upright position FIG. 18C and intervening positions.

FIGS. 19 A-C show a slightly modified embodiment of a vehicle seat generally designated 10'. The vehicle seat 10' is essentially the same as a vehicle seat 10 except that vehicle seat 10' has a modified backrest support 22' and a modified seat support 24'. The backrest support 22' supports the backrest track arrangement and also supports a headrest 11. The headrest 11 may be mounted to backrest support 22' to be vertically adjustable, as to a headrest position relative to backrest support 22'. The modified seat support 24' supports the fixed track 60 and the movable track 61 with the seat base frame 18 mounted on the movable tracks 62 via the movable track support brackets 66 (shown in FIGS. 18 A-C). The locking devices 70 are moved to an interior region—not positioned in the space between the seat base frame parts 18 and the movable track 62. Instead, the locking devices 70 are positioned between the two sides of the seat support 24'. This allows for a reduction in overall height of the configuration. Additionally, a bolster pad 80 is fixed to each link arm mid-portion 13 to form bolsters. Based on the pivot connection 26 and the pivot connection 30 with the link arm 16 connecting the backrest 12 and the seat-base 14, the backrest 12 is able to move relative to the backrest fixed trac 40 and the seat base 14 is able to move relative to the fixed tracks 60. This allows a movement of the backrest 12 and seat base 14 to a design position—FIG. 19A, to a seat full upright position—FIG. 19B and to a full recline (slouch) position—FIG. 19C as well as to intervening positions. The backrest track assembly shifts the backrest slightly so there is a fluid motion as the occupant reclines/slouches the seat system. The track assembly is mounted almost (nearly) vertically compared to the cushion track assembly which is mounted almost (nearly) horizontally. The link arm 16 between the cushion track and the backrest track provides the desired kinematic motion. The system is balanced enough between the tracks that no return springs are required. The travel ratio between the movement of the seat base (cushion) track arrangement—the movement of the seat base moveable track along the seat base fixed track—and the movement of the backrest (seat back) track arrangement—the movement of the backrest moveable track along the backrest fixed track—is about 2:1 and no pulley system is required to maintain this ratio. In particular, the a travel ratio between the movement at the seat track arrangement and the movement at the backrest track arrangement is between 1.8:1 and 2.2:1 and is advantageously about 2:1. The link arm 16 provides this connection. The seat base pivot 26 is placed below the hip-point or H-point of the occupant to help provide a fluid motion for the body in this range of recline (slouch) travel.

While specific embodiments of the invention have been shown and described in detail to illustrate the application of the principles of the invention, it will be understood that the invention may be embodied otherwise without departing from such principles.

LIST OF REFERENCE CHARACTERS

5 vehicle floor
10 vehicle seat
11 headrest
12 backrest
13 mid-portion bolster
14 seat base (cushion)
15 upper link arm cross portion
16 link arm
17 lower link arm
18 seat base frame
19 cushion upper part
20 support frame
22 vehicle backrest support
24 vehicle seat base support
26 seat base pivot
27 seat/link arm pivot shaft
28 link arm lower pivot bushing
29 seat base pivot bushing
30 link arm and backrest pivot
31 cross member
32 lower link arm and backrest connection
33 connections/screws/bolts
34 cross member slot
35 seat back bushing block
36 link arm bushing
37 pivot bracket openings
38 central web
39 backrest connection block
40 backrest fixed track
41 backrest movable track
42 pivot bracket
43 left side (first) pivot flange
44 right side (second) the pivot flange
45 left side pivot shaft
46 right side pivot shaft
47 base
48 nut and bolt connection
49 cross web
50 ball bearing arrangement
50' ball bearing arrangement
51 web
53 web
55 ball bearing
56 ball cage
56' ball straw spacer
58 pivot pin
60 seat base fixed track
62 seat base movable track
64 seat base bracket
65 fastener
66 movable track support bracket
70 locking device-longitudinal adjuster
72 support connection
74 bracket connection

What is claimed is:

1. A vehicle seat comprising:
a seat base;
a backrest;
a seat base track arrangement comprising a fixed track and a moveable track, wherein the moveable track is moveable along the fixed track, the fixed track being connected to a vehicle seat support and the moveable track being connected to the seat base;
a backrest track arrangement comprising a backrest fixed track and a backrest moveable track, wherein the backrest moveable track is moveable along the backrest fixed track, the backrest fixed track being connected to a vehicle backrest support;
a link arm;
a seat base pivot connection between the link arm and the seat base; and
a link arm and backrest pivot connection between the link arm and the backrest and the backrest moveable track, wherein the link arm and backrest pivot connection comprises:
  a link arm bushing;
  a backrest bushing; and
  a track bracket fixed to the backrest moveable track, the track bracket having a pivot shaft engaging the link arm bushing for pivoting movement of the link arm relative to the track bracket and engaging the backrest bushing for pivoting movement of the backrest relative to the track bracket.

2. A vehicle seat according to claim 1, wherein:
the link arm defines the link arm bushing and a further link arm bushing;
the backrest has the backrest bushing and a further backrest bushing;
the track bracket comprises a first bracket flange supporting the pivot shaft that engages the link arm bushing the backrest bushing and a second bracket flange supporting a further pivot shaft that engages the further link arm bushing and the further backrest bushing.

3. A vehicle seat according to claim 1, wherein:
the link arm comprises a right side link arm portion with a right lower link arm extending along a portion of a length of the seat base to a link arm right lower pivot bushing adjacent to an H-point along the length of the seat base;
the link arm comprises a left side link arm portion with a left lower link arm extending along a portion of a length of the seat base to a link arm left lower pivot bushing adjacent to the H-point along the length of the seat base;
the seat base comprises a frame part with a connected seat base right side pivot bushing and a connected seat base left side pivot bushing;
the seat base pivot connection comprises a right side seat base pivot connection with a right pivot shaft supported by said link arm right lower pivot bushing and said seat base right side pivot bushing; and
the seat base pivot connection comprises a left side seat base pivot connection with a left pivot shaft supported by said link arm left lower pivot bushing and said seat base left side pivot bushing.

4. A vehicle seat according to claim 3, wherein:
the right side link arm portion forms a right side bolster with bolster foam and trim connected to the right side link arm portion; and
the left side link arm portion forms a left side bolster with bolster foam and trim connected to the left side link arm portion.

5. A vehicle seat according to claim 3, wherein:
the backrest has a side profile shape;
the right side link arm portion has a side profile shape following the side profile shape of the backrest; and
the left side link arm portion has a side profile shape following the side profile shape of the backrest.

6. A vehicle seat according to claim 3, wherein the link arm with the link arm and backrest pivot connection, the right side seat base pivot connection, and the left side seat base pivot connection, cooperates with the seat base track arrangement and the backrest track arrangement to form a balanced system.

7. A vehicle seat according to claim 6, wherein the a travel ratio between the seat track arrangement and the backrest track arrangement is between 1.8:1 and 2.2:1.

8. A vehicle seat according to claim 6, wherein the a travel ratio between the seat track arrangement and the backrest track arrangement is about 2:1.

9. A vehicle seat according to claim 6, wherein the backrest is a live back seat back comprising a plastic panel that flexes with back movement.

10. A vehicle seat according to claim 9, wherein the live back seat back is pivotably connected to the track bracket, via the link arm and backrest pivot connection, independently of the pivot connection of the link arm to the track bracket, via the link arm and backrest pivot connection.

11. A vehicle seat according to claim 10, wherein the live back seat back is moveably connected to the link arm at a lower sliding link arm and backrest connection.

12. A vehicle seat according to claim 6, wherein the backrest includes a rigid seat back structure comprising a shell or a frame.

13. A vehicle seat according to claim 2, wherein:
the seat base track arrangement further comprises a further fixed track and a further moveable track that is moveable along the further fixed track, the further fixed track being connected to the vehicle seat support and the moveable track being connected to the seat base; and
the backrest track arrangement comprises only the backrest fixed track as a single fixed track and the only the backrest moveable track as a single backrest moveable track to provide a single track arrangement supporting movement of the backrest.

14. A vehicle seat according to claim 13, wherein:
each moveable track of the seat base track arrangement extends laterally with bearings at lateral sides; and
each fixed track of the seat base track arrangement engages bearings at the lateral sides of the respective associated moveable track.

15. A vehicle seat according to claim 13, wherein:
the single moveable track of the backrest track arrangement extends laterally with bearings at lateral sides; and
the single fixed track of the backrest track arrangement engages bearings at the lateral sides of the single moveable track.

16. A vehicle comprising:
a vehicle seat support and vehicle backrest support;
a seat base;
a backrest;
a seat base track arrangement comprising a fixed track and a moveable track, the moveable track being moveable along the fixed track, the seat base track arrangement being connected between the vehicle seat support and the seat base for movement of the seat base relative to the vehicle seat support;
a backrest track arrangement comprising a backrest fixed track and a backrest moveable track, the backrest moveable track being moveable along the backrest fixed track, the backrest track arrangement being connected to the vehicle backrest support;
a link arm;
a seat base pivot connection between the link arm and the seat base; and
one of a link arm and backrest pivot connection between the link arm and the backrest and the moveable track, wherein the link arm and backrest pivot connection comprises:
  a link arm bushing;
  a backrest bushing; and
  a track bracket fixed to the backrest moveable track, the track bracket having a pivot shaft engaging the link arm bushing for pivoting movement of the link arm relative to the track bracket and engaging the backrest bushing for pivoting movement of the backrest relative to the track bracket;
and a link arm and backrest pivot connection between the link arm and the backrest and the moveable track, wherein the link arm and backrest pivot connection comprises:
  a link arm and backrest bushing; and
  a track bracket fixed to the backrest moveable track, the track bracket having a pivot shaft engaging the link arm and backrest bushing for pivoting movement of the link arm and backrest relative to the track bracket.

17. A vehicle seat comprising:
a seat base;
a backrest;
a seat base track arrangement comprising a fixed track and a moveable track, which moveable track is moveable along the fixed track, the fixed track being connected to a vehicle seat support and the moveable track being connected to the seat base;
a backrest track arrangement comprising a backrest fixed track and a backrest moveable track, which backrest moveable track is moveable along the backrest fixed track, the backrest fixed track being connected to a vehicle backrest support;
a link arm;
a seat base pivot connection between the link arm and the seat base; and
a link arm and backrest pivot connection between the link arm and the backrest and the backrest moveable track, wherein the link arm is fixed to the backrest and the link arm and backrest pivot connection comprises:
  a link arm and backrest bushing; and
  a track bracket fixed to the backrest moveable track, the track bracket having a pivot shaft engaging the link arm and backrest bushing for pivoting movement of the link arm and backrest relative to the track bracket.

* * * * *